United States Patent [19]
Marouby

[11] 3,819,237
[45] June 25, 1974

[54] ELECTRONIC ANTISKID BRAKING SYSTEM

[75] Inventor: Guy Marouby, Neuilly, France

[73] Assignee: Societe Anonyme D.B.A., Paris, France

[22] Filed: Nov. 10, 1972

[21] Appl. No.: 305,647

[30] Foreign Application Priority Data
Dec. 2, 1971 France .............................. 71.43239

[52] U.S. Cl. ........................ 303/21 BE, 188/181 C
[51] Int. Cl. .............................................. B60t 8/08
[58] Field of Search ............ 188/181 C; 303/20, 21; 317/5; 324/161; 340/53, 263

[56] References Cited
UNITED STATES PATENTS

| | | | |
|---|---|---|---|
| 3,606,490 | 9/1971 | Ando | 303/21 BE |
| 3,640,588 | 2/1972 | Carp et al. | 303/21 BE X |
| 3,650,575 | 3/1972 | Okamoto | 303/20 X |
| 3,652,133 | 3/1972 | Yamazaki et al. | 303/21 CG |
| 3,663,070 | 5/1972 | Scharlack | 303/21 P |
| 3,701,569 | 10/1972 | Arai et al. | 303/21 BE |

Primary Examiner—Milton Buchler
Assistant Examiner—Stephen G. Kunin
Attorney, Agent, or Firm—Ken C. Decker; William N. Antonis

[57] ABSTRACT

An electronic antiskid braking system of the type using a speed reference signal having a maximum rate of decrease as established, furnished by the constant current discharge of a capacitor in a circuit, is disclosed.

The maximum slippage which is tolerated by the wheel includes a constant quantity which is determined by a potentiometer, and includes too a variable quantity, which is obtained from the direct voltage-drop in a diode. A switching device controlled by the first occuring pressure reducing signal of an antiskid braking operation, is provided to modify the intervention threshold during the initial adaptive braking cycle.

5 Claims, 1 Drawing Figure

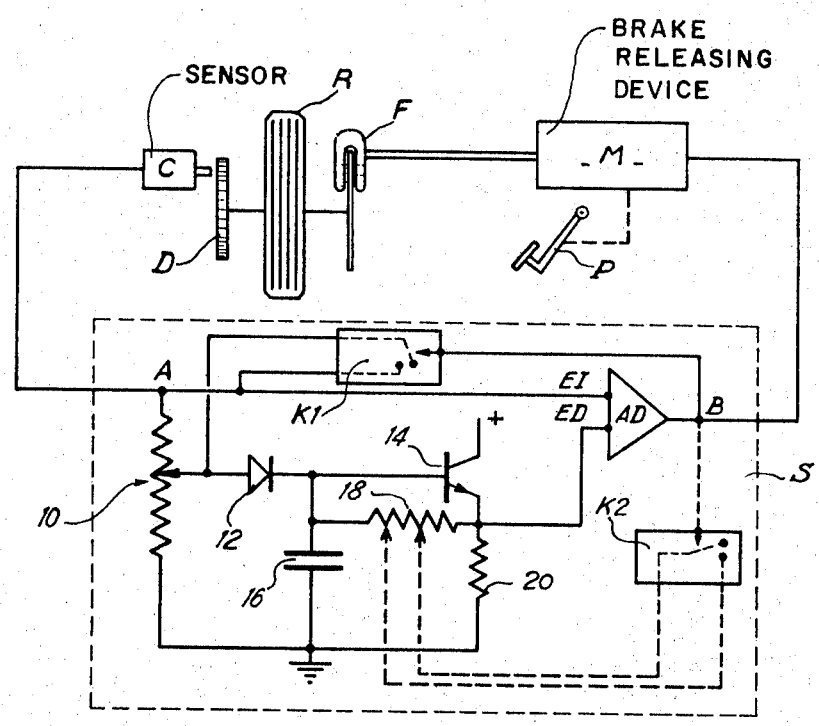

3,819,237

ELECTRONIC ANTISKID BRAKING SYSTEM

The invention relates to an electronic antiskid braking system designed to be mounted on wheeled vehicles, more particulary for motor vehicles.

More precisely, the invention discloses an electronic antiskid braking system using a speed reference signal. Briefly, in such braking systems, a signal which represents the speed of a braked wheel has its decreasing permanently compared to a speed reference signal. The maximum rate of decrease of the speed reference signal is limited, by the discharge of a capacitor in a circuit. The slipping which is tolerated to the wheel is therefore limited.

These known systems, in spite of their good working in the most cases, present several drawbacks. In particular, in the case where the maximum difference which is tolerated between the signal representing wheel speed and the speed reference signal, the rate of decrease of which is limited to a predetermined rate, the slipping of the wheel cannot be constant and equal to the value corresponding to the maximum adhesion of the wheel with regards to the ground. In addition, at low speed, the wheel speed representing signal and the speed reference signal are of low level and are subjected to be disturbed by undesirable electric noises.

Then again, during cycling of an electronic braking system, it is common to establish the rate of increasing of the braking pressure at a given rate, which is selected so that the resulting pressures have a braking effect consistant with the adhesion of the ground. Ordinarily, it is useful to moderate this pressure increase but this is made against the need of rapidly reaching an effective pressure, in order to lose the smallest time as possible to effectively initiate the braking. It is known, in order to realize these contradictory necessities, to suspend the effect of a restrictor placed in series with the braking circuit, before the adaptive braking system begins to cycle, so as to provide a relatively high initial pressure increase, and to again use this restrictor during the cyclic phase.

However, with a high rate in the initial pressure increase, it is a risk to greatly exceed the pressure which is convenient for a good adhesion braking, and therefore to lock the wheels.

The invention overcomes these drawbacks, by operating an automatic modification of the reference voltage during the initial pressure increase and by maintaining the slipping at an approximately constant value for all wheel speed which are above a given low value.

During said braking phase, the maximum rate of decrease of the speed reference signal may be equal, before the beginning of the first occuring adaptive braking cycle, to a first given rate, and equal, after said beginning and until the end of said adaptive braking phase, to a second given rate greater than said first given rate, and said predetermined percentage of the speed signal represented by the speed reference signal may be equal before the beginning of the first occuring adaptive braking cycle to a first given percentage, and equal, after said beginning to a second given percentage less than said first given percentage.

The invention will be now described by way of example, with reference to the accompanying drawing which is a schematic of an electronic antiskid braking system according to the invention.

The sole FIGURE shows an electronic antiskid braking system of a wheel R provided with a toothed disc D and a brake F. A wheel speed sensor C of any known type supplies to a point A of a circuit S a direct voltage representing the speed of the wheel R. A point B which is the output terminal of the device S, is electrically connected to braking means M, of any known type, controlled by a pedal P and actuated during an antiskid braking, said braking means M being in particular active on the brake F.

The circuit S will now be described in more detail. The input terminal A of this circuit is grounded through a potentiometer 10 which intermediate terminal charges, through a diode 12, a capacitor 16 one terminal of which is grounded. This capacitor 16 is shunted with two resistors 18 and 20 connected in series. A transistor 14 has its base connected to the common terminal of the diode 12 and of the capacitor 16, its collector connected to a positive direct voltage source, and its emittor connected to the common terminal of the resistors 18 and 20. A differential amplifier AD, of any known type, has its direct input ED connected to the emittor of the transistor 14 and its reverse input EI connected to the point A. The output of the amplifier AD is the output terminal B of the circuit S.

In a first embodiment of the invention, the intermediate terminal of the potentiometer 10 and the point A are connected to a switching device K1 controlled by the output signals provided at the point B. In this embodiment, the intermediate terminal of the potentiometer 10 and the point A can be directly connected together by means of the device K1.

In another embodiment, the device K1 is cancelled and a switching device K2 controlled by the output signals supplied at point B is connected (as shown with dated lines on the FIGURE) to a part of the resistor 18, so as to replace this part by a short circuit.

The devices K1 and K2 can be of any known type, for example a switching transistor. The working of the system shown on the FIGURE is the following:

When the wheel R is rotating, it supplies at the point A, by means of the sensor C, a direct voltage representing its angular velocity. This voltage charges, through the potentiometer 10 and the diode 12, the capacitor 16 which voltage is therefore proportional to the voltage at point A, according to a porportionality coefficient imposed by the potentiometer 10, but inferior to this value by an amount equal to the direct voltage drop in the diode 12, that is to say approximatively 0.5 volt. Simultaneously, the capacitor 16 is discharged in the circuit including the resistors 18 and 20 and the transistor 14, which circuit is a constant current discharge circuit of known type.

When the voltage at point A is constant or in an increasing phase, the voltage charging the capacitor 16 is inferior to the voltage fed to A on the one band, by an amount equal to the direct voltage drop in the diode 12 (0.5 volt), and, on the other hand, by an amount proportional to this voltage fed to A and determined by the potentiometer 10. The amplifier AD receives a lower voltage at its terminal ED than it receives at its terminal EI, and its output voltage at point B is zero.

When the voltage fed to A becomes decreasing, due to an application of the brake F to the wheel R, the diode 12 prevents the capacitor 16 from discharging in the potentiometer 10. This capacitor therefore discharges to the resistors 18 and 20 and the transistor 14.

This discharge being at its maximum a constant current discharge, as long as the rate of decrease of the voltage at A is less than this constant rate of decrease of the voltage of the capacitor 16, the voltage of the capacitor 16 is equal to the voltage of the intermediate terminal of the potentiometer 10, less 0.5 volt (the voltage drop in the diode 12) and the amplifier AD remains locked.

If at a given moment the votlage at A decreases faster than the voltage of the capacitor 16 can decrease, the voltage at the terminals of the capacitor 16 becomes greater than the voltage at the intermediate point of the potentiometer 10 less 0.5 volt. If this decreasing condition is maintained, the voltage at A becomes less than the voltage at terminal ED, and the amplifier AD then supplies the point B with an output signal which is a relax signal.

This relax signal is used by the means R to relax the braking pressure fed to the brake F. As a result there is a drop in the rate of decrease of the speed of the wheel R and therefore in that of the voltage applied to A, so that this voltage again equals and then exceeds the voltage applied to the terminal ED. At the moment in which these two voltages become equal, the amplifier AD becomes blocked again, and the relax signal is interrupted. The braking pressure can then increase again in the braking circuit of the wheel R. Simultaneously, as soon as the voltage at the intermediate point of the potentiometer 10 exceeds the voltage of the capacitor 16 by 0.5 volt, the diode 12 becomes conductive again and charges this capacitor to a voltage proportional to the voltage at A, but less 0.5 volt. The anti-lock cycle can then be repeated.

It will be noted that the voltage of the capacitor 16 which constitutes the reference voltage on the one hand is inferior by a constant amount (0.5 volt) to the voltage at A, and, an the other hand, is inferior to this voltage at A by an additional amount proportional to this voltage at A and imposed by the potentiometer 10. Hence, the maximum slipping tolerated to the wheel R, during a deceleration and before the advent of the relax signal at B, is the sum of a constant slipping, for any speed, imposed by the potentiometer 10, and of a slipping which is relatively low for the high speeds of the wheel R, but more important for the low speeds of this wheel, and improsed by the voltage drop in the diode 12.

The working of the device K1 will be now described.

This switching device K1 is designed to establish a short cricuit between the point A and the intermediate terminal of the potentiometer 10 before the advent of the first relax signal at point B. After the beginning of this first relax signal, the device K1 is set off and the system acts in the manner hereinabove described. In return, before the beginning of this first relax signal, the point A is directly connected to the intermediate terminal of the potentiometer 10 by means of K1, and the slipping which is tolerated to the wheel R during the initial rising of the braking pressure is therefore restricted to a low value corresponding to the voltage drop in the diode 12. So, the initial braking pressure rising can be faster than the braking pressure risings of the ulterior antiskid cycles, without disposing the wheel R in such conditions that it locks. The device K1 is designed so that it is only actuated by the first relax signal of an antiskid braking phase.

In another embodiment, the device K1 is cancelled and replaced by the device K2. In this case, after the advent of the first relax signal at point B, a part of the discharge resistor 18 is transformed into a short circuit by the device K2, but in return, before the advent of this first relax signal, the device K2 is off and the discharge resistor 18 is used in its totality. As a result, before the advent of the first relax signal, the maximum rate of decrease of the voltage of the capacitor 16 is limited to a relatively low value with respect to the value which is allowed after the advent of this first relax signal. In effect, the lower the resistors 18 and 20, the faster the discharge of the capacitor 16.

This modification of the rate of discharge of the capacitor 16 being a modification of the rate of decrease of the wheel speed reference voltage, it will be understood that the intervention of the antiskid braking will be earlier during the initial braking pressure rising than during the successive antiskid cycles.

At the end, according to another embodiment, the devices K1 and K2 can be used together, their respective working being the same as those which have just been described.

I claim:

1. In a vehicle having a wheel and a fluid pressure operated brake controlling said wheel, an adaptive braking system for controlling said brake comprising:
   means for generating a first signal proportional to the rotational velocity of said wheel;
   means for generating a second signal equal to a predetermined percentage of said first signal;
   means for limiting the decrease in the second signal to a predetermined rate when said first signal decreases in excess of said predetermined rate;
   means for effecting a brake pressure reduction cycle when the value of said first signal drops below the value of said second signal during decrease of the latter at said predetermined rate and for terminating said brake pressure reduction cycle when the value of said first signal increases above the value of the second signal during decrease of the latter at said predetermined rate; and
   switching means actuated after the first brake pressure reduction cycle for changing the value of said second signal at which the brake pressure reduction cycle is terminated on subsequent brake pressure reduction cycles.

2. The invention of claim 1:
   said switching means changing said predetermined percentage of said first signal represented by said second signal on said subsequent brake pressure reduction cycles.

3. The invention of claim 2:
   said means for generating said second signal including a potentiometer connected between said generating means and ground, a capacitor connected to the middle terminal of said potentiometer whereby the capacitor is changed to a predetermined percentage of the output of said generating means, said limiting means preventing discharge of said capacitor in excess of said predetermined rate;
   said switching means changing the value of the resistance of the potentiometer to thereby change said predetermined percentage of said first signal to which said capacitor is changed.

4. The invention of claim 1:

said means for limiting the decrease in the second signal being responsive to said switching means to change the rate of decrease to which said second signal is limited on said subsequent brake pressure reduction cycles.

5. The invention of claim 4:
said means for generating said second signal including a capacitor, and means for changing said capacitor to said predetermined percentage of said first signal;
said limiting means including resistance means connected to said capacitor to limit discharge of the latter to a predetermined rate;
said switching means changing the value of the resistance of said resistance means to thereby change the predetermined rate at which the capacitor is discharged.

* * * * *